(12) United States Patent
Claringburn

(10) Patent No.: US 7,693,423 B2
(45) Date of Patent: Apr. 6, 2010

(54) MAXIMISING POWER IN OPTICAL COMMUNICATION NETWORKS

(75) Inventor: Harry Richard Claringburn, Nottingham (GB)

(73) Assignee: Ericsson AB, Stockholm (SE)

( * ) Notice: Subject to any disclaimer, the term of this patent is extended or adjusted under 35 U.S.C. 154(b) by 881 days.

(21) Appl. No.: 10/517,671

(22) PCT Filed: Jun. 11, 2003

(86) PCT No.: PCT/GB03/02508

§ 371 (c)(1),
(2), (4) Date: Sep. 19, 2005

(87) PCT Pub. No.: WO03/105384

PCT Pub. Date: Dec. 18, 2003

(65) Prior Publication Data

US 2006/0098990 A1  May 11, 2006

(30) Foreign Application Priority Data

Jun. 11, 2002 (GB) .............................. 0213385.8

(51) Int. Cl.
*H04B 10/16* (2006.01)
*H04J 14/02* (2006.01)

(52) U.S. Cl. .......................................... 398/83; 398/97

(58) Field of Classification Search ............. 398/82–83, 398/97
See application file for complete search history.

(56) References Cited

U.S. PATENT DOCUMENTS

| | | | |
|---|---|---|---|
| 5,225,922 A | 7/1993 | Chraplyvy et al. | |
| 6,040,933 A * | 3/2000 | Khaleghi et al. | 398/1 |
| 6,115,157 A * | 9/2000 | Barnard et al. | 398/1 |
| 6,701,089 B1 * | 3/2004 | Goodwin et al. | 398/79 |
| 6,819,479 B1 * | 11/2004 | Islam et al. | 359/337 |
| 2002/0015199 A1 | 2/2002 | Eder et al. | |
| 2002/0015201 A1 * | 2/2002 | Zhou et al. | 359/124 |
| 2002/0109881 A1 | 8/2002 | Yang | |
| 2003/0138255 A1 * | 7/2003 | Cook et al. | 398/94 |

FOREIGN PATENT DOCUMENTS

| | | |
|---|---|---|
| CA | 2 347 687 A1 | 5/2000 |
| EP | 0 543 570 A2 | 11/1992 |
| EP | 0 924 888 A2 | 6/1999 |
| EP | 0 926 854 A2 | 6/1999 |
| EP | 1 011 221 A2 | 6/2000 |
| WO | WO 02/09299 A2 | 1/2002 |

OTHER PUBLICATIONS

Ramaswami, R. and K.N. Sivarajan. Optical Networks: A Practical Perspective. San Francisco: Morgan Kaufmann Publishers, Inc., 1998.*

Weik, Martin H. "comparator", "management information system", "management system". Fiber Optics Standard Dictionary. 3rd ed. 1997.*

* cited by examiner

*Primary Examiner*—Leslie Pascal
(74) *Attorney, Agent, or Firm*—Kirchstein, et al.

(57) ABSTRACT

The relative launch power of signals at an add/drop node transponder is controlled to maximize available power. Known values of signal bandwidth and likely noise in the signal path, for example, derived from the system manager, are used to control the launch power into the optical amplifier, in order to optimize the launch power accordingly.

18 Claims, 3 Drawing Sheets

MAXIMISING POWER IN OPTICAL COMMUNICATION NETWORKS

Figure 1:
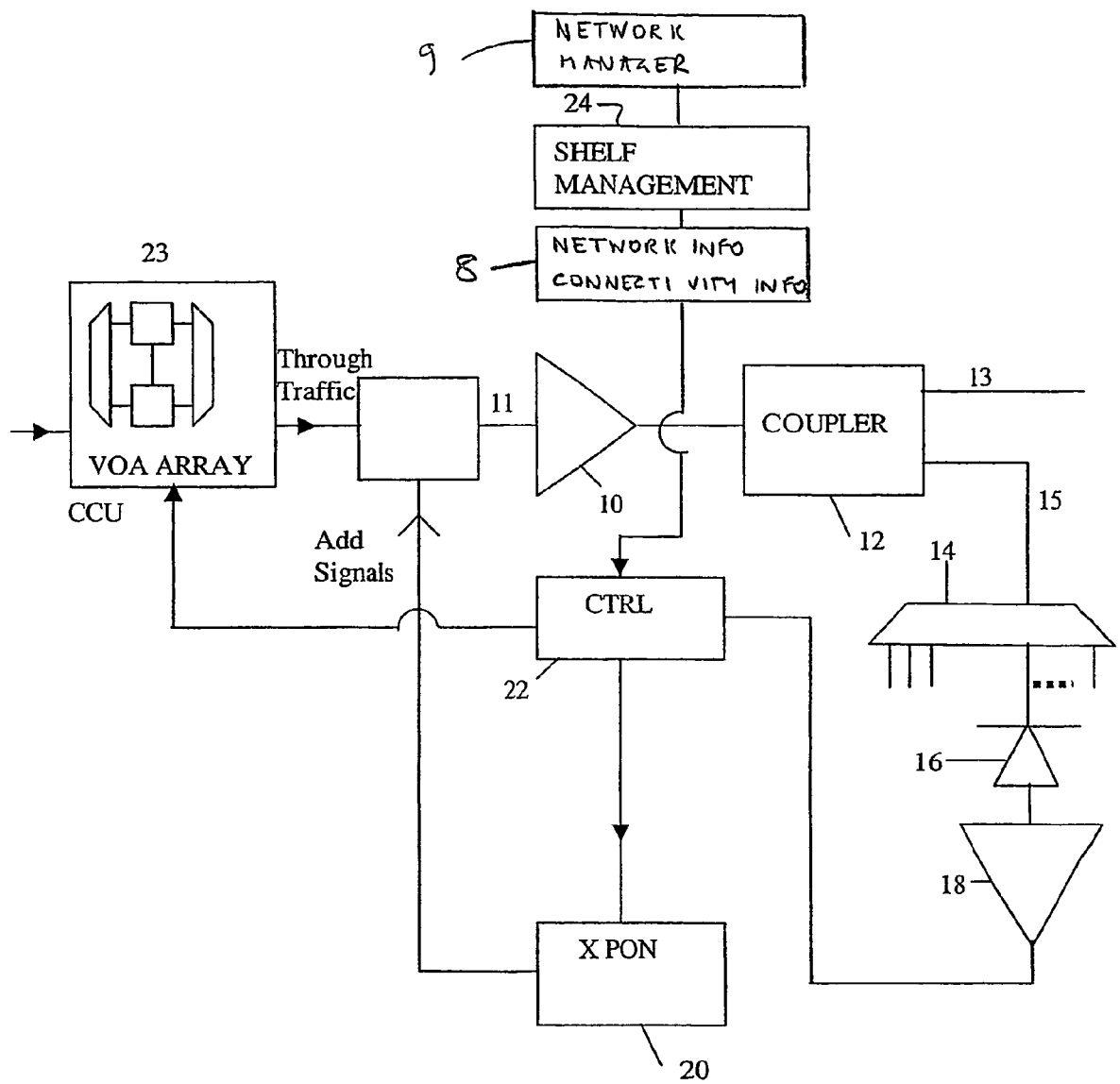

This invention relates to optical communications networks, and in particular to optimising power available to launch signals onto optical communications networks.

The design of photonics systems requires that the OSNR (optical signal to noise ratio) is above a given minimum value over the longest path under the worst case conditions.

Optical communication systems, such as wavelength division multiplex (WDM) systems typically use optical amplifiers in the signal path. A limiting feature of optical amplifiers is the power available. This may be due to safety constraints or cost. The maximum output power of an optical amplifier is conventionally divided equally amongst all the optical channels being transmitted.

However, higher bit rate channels such as 10 Gbit/s require a better OSNR than lower bit rate channels such as 2.5 Gbit/s channels.

It has been proposed (EP-A-0 924 888) to adjust the optical power in individual channels by measuring optical power along the transmission path in use. However, the processing overload for this is relatively high.

Also, it has been proposed (WO 02/09299) to compensate for wavelength dependent gain and noise profiles by pre-emphasising individual channels of a WDM by values obtained by measuring the OSNR of the undistorted channels.

The invention aims to maximise the power available to optical signals requiring a higher bandwidth and/or greater path length. Broadly, this is achieved by dividing available output power amongst the optical channels according to their individual bandwidth/distance requirements.

More specifically, there is provided a method of controlling signal launch power of at least one optical signal in an optical communications network, comprising pre-distorting the launch power of the optical signal in accordance with a known value of the bandwidth of a modulation signal used to modulate the optical signal.

The invention also provides apparatus for controlling signal launch power of at least one optical signal in an optical communications network, comprising a launcher for launching the optical signal onto the network, and means for pre-distorting the launch power of the optical signal in accordance with a known value of the bandwidth of a modulation signal used to modulate the optical signal.

This has the advantage that launch power of a first optical signal can be conserved and redirected to a second optical signal whose associated modulation signal has a greater bandwidth than the modulation signal associated with the first optical signal, without incurring a processing overload due to making measurements.

Preferably, the optical communications network carries an n channel signal multiplex, and a plurality of optical signals are launched from a network node.

Preferred embodiments have the advantage that for a given launch power available at an add/drop node, the power can be distributed amongst the channels in accordance with the requirements of each channel. This again can increase the bandwidth that can be sent and increase the transmission distance that can be achieved.

The noise is generated at the optical amplifiers, and the expected noise can be determined knowing the route of the optical signal, that is, the number and type of optical amplifiers—the optical signal will pass through in the network. This will be indicative of the OSNR. The known values may be provided by management systems of the optical communication systems, for example, by the network manager, or by a shelf manager. Equally, the known values may be provided by data passed along a supervisory channel.

In a preferred embodiment, the pre-distorted optical signals are passed though an optical amplifier, and the launch power is pre-distorted using a comparator. A separate comparator is provided for each channel of the optical multiplex, a suitable de-multiplexer being provided at the output of the optical amplifier. One input to the comparator is a signal, preferably electrical, derived from the output of the optical amplifier for any particular optical channel, while the other is representative of the known value of the bandwidth of the modulation signal associated with the optical signal. The output of the comparator controls the launch power of the optical signal for that channel into the optical amplifier, for example, by means of a variable optical attenuator for a through channel, or a transponder for an added channel.

Figure 2:
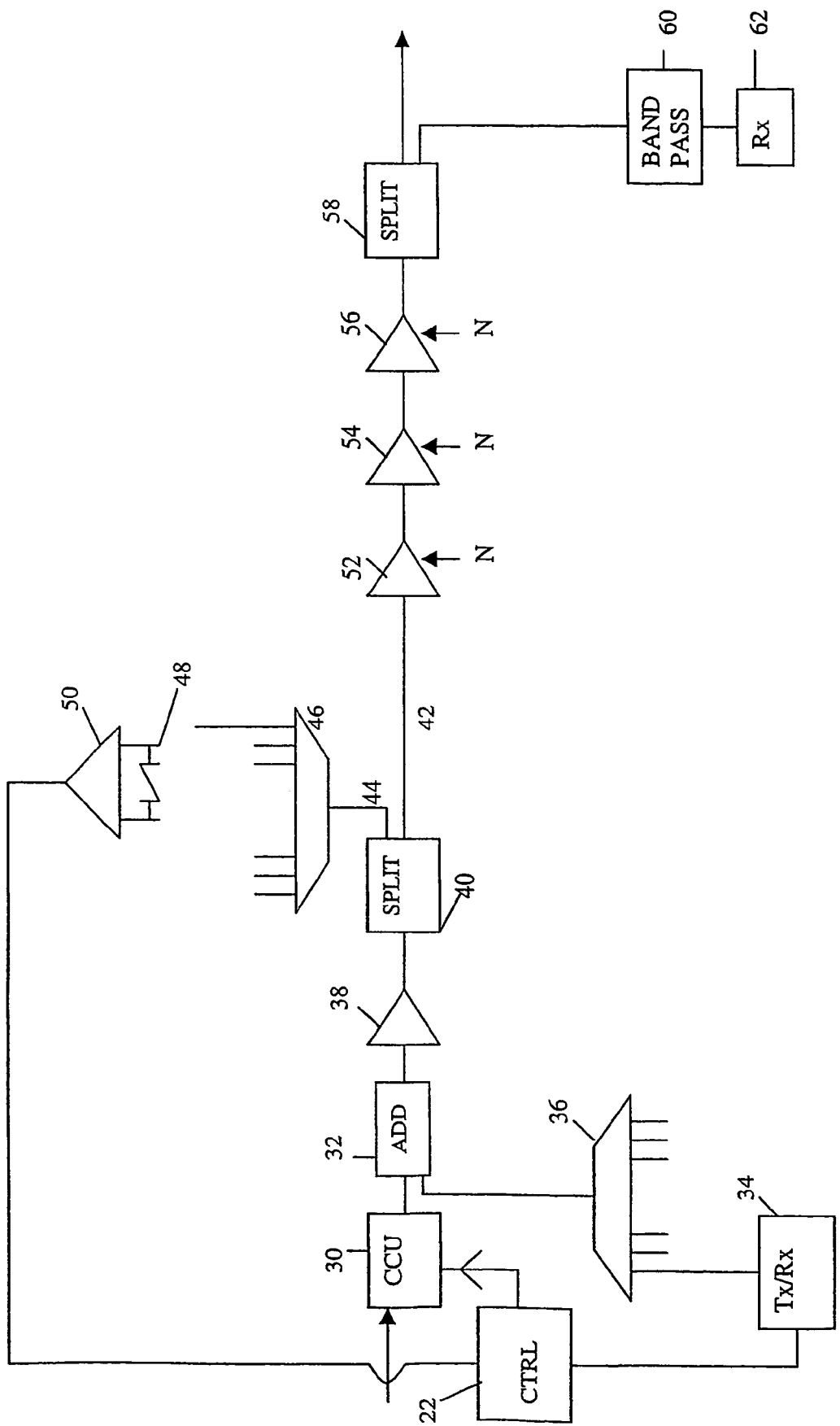
Figure 3:
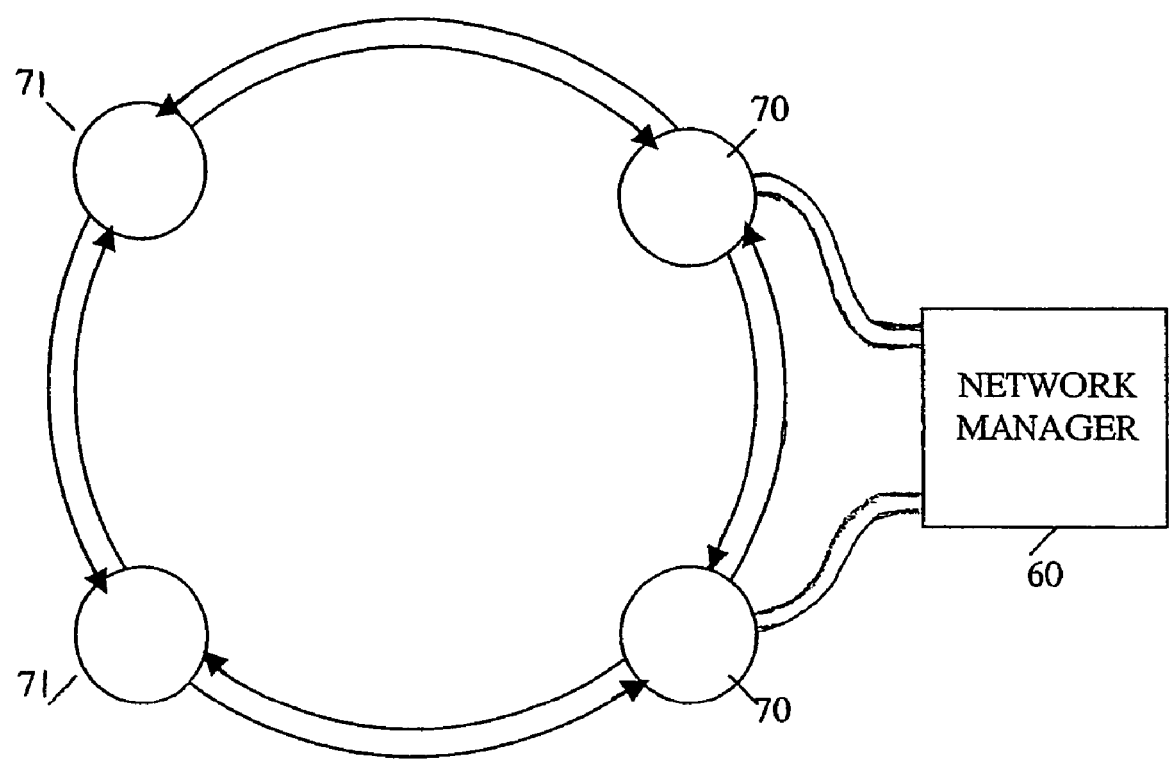

An embodiment of the invention will now be described, by way of example only, and with reference to the accompanying drawings, in which:

FIG. 1 is a schematic diagram illustrating the principle of the invention;

FIG. 2 is a schematic diagram showing how launch power can be adjusted according to the connection path; and FIG. 3 shows the invention applied to an optical ring network The embodiments described divide the available output power amongst the channels according to individual bandwidth requirements. The higher the bit rate, the higher the power level allocated to that channel ensuring that all channels are launched such that they are received with adequate OSNR.

The power output for a given channel can also be controlled according to the number and type of network elements the signal is to pass through.

Referring to FIG. 1, an optical amplifier 10 amplifies a WDM optical signal on a fibre 11. The output is split at a coupler 12 providing an output signal path 13 and a feedback control path 15. The feedback control path is demultiplexed by a demultiplexer 14 the outputs of which each have a pin diode 16 attached to convert the individual channels signals into electrical signals. Only one is shown in FIG. 1 for simplicity. The electrical signals are amplified by amplifier 18 and then passed to a controller 22 the outputs of which are connected to transponder 20 or CCU 23 (a variable optical attenuator array) depending on whether a channel is being added or passed through. In practice, the amplifier will amplify a number of channels, for example up to 32, but there is a separate controller 22 for each channel. Each controller acts as a comparator, which compares the output of the amplifier 18, indicative of the power amplitude of the channel at the output of the optical amplifier, with a reference level, chosen so that the output of the comparator, which is fed to the CCU or the transponder, produces a launch signal of the desired power for that channel as input to the optical amplifier.

In accordance with the invention, the launch power of each channel is pre-distorted in accordance with the known bandwidth of each channel (its bit rate) and in accordance with the noise expected to be added to each signal in consequence of its routing.

The controller 22 receives the network and connectivity information 8 required to assess the bandwidth and the routing from a shelf management unit 24 under the overall control of network manager 9 and, knowing the power of the channel, its bandwidth and the OSNR of the path, alters the reference at the comparator input to control the launched power of the channel to optimise it. Thus, for example, it can be ensured that the signal is not launched with too much power as this would waste a power resource that could be directed to a higher bit rate channel.

Each channel may carry a different signal having a different bandwidth and therefore have a different launch power requirement. The system manager can evaluate each signal's power requirement for its known bandwidth and routing. The system manager can then formulate a target power level for the controller to set the launched power level. Thus, the available launch power is not simply divided equally across the channels but distributed according to a measure of channel power requirement, such as signal bandwidth and noise expected to be added, both as regards the number of optical amplification stages passed through and as regards the type of optical amplifier passed through.

Although the launch power is adjusted to take account of bit rate and signal routing, it would be possible for the launch power to take account of one of these only.

Turning now to FIG. 2, the circuit illustrated schematically shows how the connection path can be determined. The figure illustrates a portion of an add/drop node which adds signals on to the network.

Thus, the add side of the add/drop node comprises a channel control unit 30 to control through traffic and an add coupler 32 for addition of signals to the network. The signals to be added are provided from the transmitters of node transponders 34 which output a number of signals on separate channels, for example up to 32. These signals are multiplexed together by an optical multiplexer 36 and the signal multiplex added onto the network by the coupler 32.

The output of the coupler is amplified by an optical amplifier 38 and a signal split from the main network path to derive a feedback signal by a splitter coupler 40. The coupler 40 has two outputs: a through output 42 which is the main network path, and a drop path 44 from which the feedback signal is derived. The drop path 44 carries the dropped signal multiplex to a demultiplexer 46 where it is split into its component channels. A feedback signal is derived for each of the these channels, one only of which is shown in FIG. 2. The optical output of the channel from demultiplexer 46 is converted to an electrical signal by photodiode 48, amplified by amplifier 50 and fed back to the controller block 22 where the feedback signal is compared with a reference signal and a control output generated to adjust the transponder. The reference signal is derived from the signal bandwidth and routing information stored in blocks similar to blocks 8, 24 and 9 of FIG. 1, but not shown in FIG. 2, and used in the controller 22 as before.

The signal on the through path continues around the network until it reaches its destination, whereupon the signal is dropped to a receiver. Where a channel passes through a node the levelling controller block will control the amplitude of the channel for the current received relative amplitude. The signal will pass through various stages of processing depending on how long it stays on the network. Each of these will introduce an amount of noise onto the signal. In the example of FIG. 2, the signal is shown as passing through three amplification stages 52, 54, 56 by way of example. Each of these adds an element of noise N to the signal. Thus, the total signal noise will depend on the route taken by the signal to its destination.

This signal is eventually dropped to the receiving node by a split coupler 58, filtered by a band pass filter 60 to isolate the signal channel and passed to a receiver Rx 62 where it is converted to an electrical signal for the user. The controller block 22 knows the noise on the signal at the receiver, and the bandwidth of the signal, from the blocks similar to blocks 8,24 and 9 in FIG. 1, and can adjust the launch power of the signal accordingly.

The transponder seeks to send the signal with just sufficient power to exceed the minimum OSNR thereby optimising power utilisation. As with the previous example of FIG. 1, the controller 22 seeks to distribute the launch power to optimise the power for the bandwidth and paths of the signals.

FIG. 3 shows schematically how the network manager is attached to a ring network 60, via gateway nodes 70, to manage the flow of traffic between these nodes and other nodes 71. The various amplifiers between the nodes, such as amplifiers 52, 54 and 56 operate at a constant gain. It is therefore possible for the network manager to determine the noise contribution of each amplifier and to determined the signal path. Thus, the network manager can provide the add/drop node transponder launching the signal with an indication of the likely noise on the signal. The network manager will always be aware of the signal path, including, for example, cases where a signal is sent round the longer of the two paths on a two fibre ring network, due to a component failure or the like on the shorter path.

It will be appreciated from the above description that embodiments of the invention have the advantage of allowing the launch power for a signal to be chosen according to parameters of the signal such as bandwidth and signal path. This enables available launch power to be distributed intelligently according to channel requirements. Moreover, it can enable other channels to be used at higher bandwidths or greater distances than would otherwise be possible.

Various modifications to the embodiments described are possible and will occur to those skilled in the art without departing from the scope of the invention. For example, instead of using the network and shelf manager to provide the expected routing to the block 8, this information could be provided by the supervisory channel, which could record the number and types of optical amplifiers which channels have passed through. In the case of FIG. 3, a knowledge of the type of amplifier to be passed through by a signal propagating from gateway node 70 to node 71, could be extracted from a signal which has passed through the node 71 in the reverse direction on its way to the node 70, since the optical amplifiers for each direction in a node will often be identical.

The invention claimed is:

1. A method of controlling signal launch power of at least one optical signal in an add/drop node of an optical communication network, comprising the step of: pre-distorting the launch power of the at least one optical signal in accordance with a known value of a bandwidth of a modulation signal used to modulate the at least one optical signal, by passing the at least one pre-distorted optical signal through an optical amplifier of the add/drop node, and by comparing a signal derived from an output of the optical amplifier with a reference signal dependent on the known value of the bandwidth of the modulation signal used to modulate the at least one optical signal by using a comparator.

2. The method as claimed in claim 1, wherein the pre-distorting step is performed by pre-distorting the launch power of the at least one optical signal in accordance with a known value of expected noise on a signal path of the at least one optical signal.

3. The method as claimed in claim 2, wherein the known values are provided by management systems of the optical communication network.

4. The method as claimed in claim 2, wherein the known values are provided by a network and connectivity information unit.

5. The method as claimed in claim 2, wherein the known values are supplied by a supervisory channel.

6. The method as claimed in claim 2, wherein the known value for expected noise on the signal path of the at least one optical signal is derived from a knowledge of a number and a type of the optical amplifier through which the at least one optical signal will pass.

7. The method as claimed in claim 1, wherein the optical communication network carries an n channel multiplex.

8. The method as claimed in claim 1, wherein the launch power of the at least one optical signal with an associated modulation signal of a higher bandwidth is pre-distorted to increase a signal level of the at least one optical signal compared to an optical signal with an associated modulation signal of a lower bandwidth.

9. The method as claimed in claim 2, wherein the launch power of the at least one optical signal is pre-distorted to increase a signal level of the at least one optical signal when the expected noise on the signal path of the at least one optical signal through the network is higher compared to an optical signal having a lower than expected noise on its signal path through the network.

10. An add/drop node apparatus for controlling signal launch power of at least one optical signal in an optical communication network, comprising:
   a) a launcher for launching the at least one optical signal onto the network;
   b) means for pre-distorting the launch power of the at least one optical signal in accordance with a known value of a bandwidth of a modulation signal used to modulate the at least one optical signal;
   c) an optical amplifier through which at least one pre-distorted optical signal is passed in use; and
   d) the pre-distorting means including a comparator for comparing a signal derived from an output of the optical amplifier with a reference signal dependent on the known value of the bandwidth of the modulation signal used to modulate the at least one optical signal.

11. The apparatus as claimed in claim 10, wherein the means for pre-distorting the launch power of the at least one optical signal is also operative for pre-distorting the launch power of the at least one optical signal in accordance with a known value of expected noise on a signal path of the at least one optical signal.

12. The apparatus as claimed in claim 11, wherein the known values are provided in use by management systems of the optical communication network.

13. The apparatus as claimed in claim 12, wherein the known values are provided by a network and connectivity information unit.

14. The apparatus as claimed in claim 12, wherein the known values are supplied by a supervisory channel.

15. The apparatus as claimed in claim 11, wherein the expected noise is derived from a number and a type of the optical amplifier through which the at least one optical signal will pass in the optical communication network.

16. The apparatus as claimed in claim 10, wherein the optical communication network is adapted to carry an n channel multiplex.

17. The apparatus as claimed in claim 10, wherein the pre-distorting means is operative for increasing a signal level of the at least one optical signal with an associated modulation signal of a higher bandwidth compared to an optical signal with an associated modulation signal of a lower bandwidth.

18. The apparatus as claimed in claim 11, wherein the pre-distorting means is operative for increasing a signal level of the at least one optical signal having a higher than expected noise on its signal path through the network compared to an optical signal having a lower than expected noise on its signal path through the network.

* * * * *

UNITED STATES PATENT AND TRADEMARK OFFICE
CERTIFICATE OF CORRECTION

| | | |
|---|---|---|
| PATENT NO. | : 7,693,423 B2 | Page 1 of 1 |
| APPLICATION NO. | : 10/517671 | |
| DATED | : April 6, 2010 | |
| INVENTOR(S) | : Claringburn | |

It is certified that error appears in the above-identified patent and that said Letters Patent is hereby corrected as shown below:

On the Title Page, in Field (74), under "Attorney, Agent, or Firm", in Column 2, Line 1, delete "Kirchstein," and insert -- Kirschstein, --, therefor.

In Column 2, Lines 24-25, delete "network" and insert -- network. --, therefor.

In Column 3, Line 39, delete "the", before "these".

Signed and Sealed this
First Day of March, 2011

David J. Kappos
*Director of the United States Patent and Trademark Office*